United States Patent
Wigant

(10) Patent No.: US 9,541,056 B2
(45) Date of Patent: Jan. 10, 2017

(54) WAVE POWER CONVERTER

(71) Applicant: PATENTSELSKABET AF 30. NOVEMBER 2014 APS, Frederiksberg C (DK)

(72) Inventor: Lars Wigant, Esbjerg (DK)

(73) Assignee: PATENTSELSKABET AF 30. NOVEMBER 2014 APS (DK)

( * ) Notice: Subject to any disclaimer, the term of this patent is extended or adjusted under 35 U.S.C. 154(b) by 156 days.

(21) Appl. No.: 14/408,411

(22) PCT Filed: Jun. 20, 2013

(86) PCT No.: PCT/DK2013/050202
§ 371 (c)(1),
(2) Date: Dec. 16, 2014

(87) PCT Pub. No.: WO2013/189500
PCT Pub. Date: Dec. 27, 2013

(65) Prior Publication Data
US 2015/0167629 A1 Jun. 18, 2015

(30) Foreign Application Priority Data
Jun. 20, 2012 (DK) .................. 2012 70344

(51) Int. Cl.
*F03B 13/18* (2006.01)
*H02K 7/18* (2006.01)

(52) U.S. Cl.
CPC ........... *F03B 13/182* (2013.01); *F03B 13/187* (2013.01); *H02K 7/1807* (2013.01); *Y02E 10/38* (2013.01)

(58) Field of Classification Search
CPC ...... H02K 7/1807; Y02E 10/38; F03B 13/182; F03B 13/187

(Continued)

(56) References Cited

U.S. PATENT DOCUMENTS

| 4,453,894 A | 6/1984 | Ferone |
| 6,231,268 B1 * | 5/2001 | Hausenbauer ...... B01F 7/00733 |
| | | 366/285 |

(Continued)

FOREIGN PATENT DOCUMENTS

| CN | 101263265 A | 9/2008 |
| DE | 102008029589 A1 | 12/2009 |

(Continued)

OTHER PUBLICATIONS

International Search Report; PCT/DK2013/050202; International Filing Date: Jun. 20, 2013; 3 pgs.
Written Opinion; PCT/DK2013/050202; International Filing Date: Jun. 20, 2013; 3 pgs.

*Primary Examiner* — Tulsidas C Patel
*Assistant Examiner* — Sean Gugger
(74) *Attorney, Agent, or Firm* — Schmeiser, Olsen & Watts, LLP

(57) ABSTRACT

A wave power converter for converting energy from waves including a wave power converter housing with a bottom and a top between which there is a distance limiting structure, and through which there is a central axis, and wherein entirely or partially outside the wave power converter housing there is at least one preferably elongated paddle having a longitudinal direction of a first generatrix and a lower end and an upper end, and which via a first connection to a first power converter with a rotary axis at an angle, preferably at right angles, to the central axis and fastened to the wave power converter housing at the top is provided.

20 Claims, 3 Drawing Sheets

(58) Field of Classification Search
USPC .................................... 290/42, 53; 60/499
See application file for complete search history.

(56) References Cited

U.S. PATENT DOCUMENTS

| | | | | |
|---|---|---|---|---|
| 7,839,009 | B2* | 11/2010 | Rink | F03B 13/264 |
| | | | | 290/43 |
| 8,584,454 | B2* | 11/2013 | Williams | F03B 13/18 |
| | | | | 60/497 |
| 2004/0007881 | A1 | 1/2004 | Kobashikawa et al. | |
| 2006/0150626 | A1* | 7/2006 | Koivusaari | F03B 13/182 |
| | | | | 60/499 |
| 2008/0191485 | A1* | 8/2008 | Whittaker | F03B 13/182 |
| | | | | 290/53 |
| 2009/0218822 | A1 | 9/2009 | Rink | |
| 2010/0156106 | A1 | 6/2010 | Finnigan | |
| 2010/0181772 | A1 | 7/2010 | Ozturk | |
| 2011/0018276 | A1* | 1/2011 | Whittaker | F03B 13/182 |
| | | | | 290/53 |
| 2011/0298215 | A1 | 12/2011 | Wille et al. | |
| 2014/0322996 | A1* | 10/2014 | Nakamura | F03D 11/045 |
| | | | | 440/8 |

FOREIGN PATENT DOCUMENTS

| | | | |
|---|---|---|---|
| FR | 379050 | A | 10/1907 |
| FR | 1408079 | A | 8/1965 |
| WO | 00/52331 | A1 | 9/2000 |
| WO | 2010/049708 | A2 | 5/2010 |

* cited by examiner

WAVE POWER CONVERTER

FIELD OF THE INVENTION

The present invention concerns a wave power converter including a wave power converter housing with a bottom and a top between which there is a distance limiting structure and through which there is a central axis, and wherein entirely or partially outside the wave power converter housing there is at least one preferably elongated paddle with a longitudinal direction of a first generatrix and a lower end and an upper end, and which paddle via a first connection is connected with a first power converter with a rotary axis preferably at right angles to the central axis and fastened to the wave power converter housing at the top. The first power converter interacts via at least one piston rod with at least one second power converter as a first end of the piston rod via a flexible joint is fastened to the first power converter, and as a second end of the piston rod has a piston adapted for a linear movement along a second generatrix in the at least one second power converter, which includes a linear chamber surrounded by a chamber casing on which is provided a rotatable and pivotable connection to the wave power converter housing at the bottom in continuation of the second generatrix.

BACKGROUND OF THE INVENTION

Conversion of energy stored in a medium into usable energy for industrial use is of great significance.

Converting energy waves, preferably at sea, is very attractive as the energy density in water is higher compared to the energy density in air.

The high energy density in the waves of the water is, however, also challenging to the durability of constructions. During a storm or other weather extremes, there are very strong physical impacts to be mitigated.

The patent application WO 0052331 indicates a system which produces energy from sea waves in that the energy in a wave is transmitted via a paddle connected to a crank arrangement to a reciprocating piston in a chamber casing.

OBJECT OF THE INVENTION

It is the object of the invention to indicate a technical solution providing a wave power converter which solves or alleviates one or more of the above mentioned technical problems.

It is a further object of the invention to indicate a technical solution that provides as simple operation as possible.

It is a further object of the invention to indicate a technical solution operating by wave particle movements that are more or less turbulent movements, or wave particle movements that are more or less harmonic movements.

It is a further object of the invention to indicate a technical solution that is as simple to maintain as possible.

DESCRIPTION OF THE INVENTION

The above objects are achieved by a wave power converter which includes:
a wave power converter housing with a bottom and a top between which there is a distance limiting structure and through which there is a central axis, and where entirely or partially outside the wave power converter housing there is
at least one preferably elongated paddle having a longitudinal direction of a first generatrix and a lower end and an upper end, and which via a first connection is connected to
a first power converter with a rotary axis at an angle, preferably at right angles, to the central axis and fastened to the wave power converter housing at the top, and wherein
the first power converter interacts via at least one piston rod with at least one second power converter as a first end of the piston rod via a flexible joint is fastened to the first power converter, and as a second end of the piston rod has a piston adapted for a linear movement along a second generatrix in the at least one second power converter, which includes a linear chamber surrounded by a chamber casing on which is provided a rotatable and pivotable connection to the wave power converter housing at the bottom in continuation of the second generatrix.

Wave energy is thereby converted by a preferably horizontal movement via at least one paddle that will pivot and thereby follow the more or less harmonic or irregular, preferably horizontal movements, and transfer the latter into a linear displacement of a piston in a chamber, whereby a fluid is pressurised and/or set into motion, whereby there is provided a fluid in a condition which is usable for driving a machine.

The rotatable and pivotable connection in continuation of the chamber casing and to the wave power convert housing at the bottom results in that the second generatrix can perform a movement within a cone, the position of the apex of which determined by the pivotable part of the connection.

According to the invention, a paddle is to be understood as an absorber of wave particle movements.

According to a preferred embodiment, the paddle is designed as an elongated plate. Within the scope of the invention, the shape of the plate may be varied for optimal absorption of the wave particle movement.

According to an embodiment, a paddle is flexible and can be bent in longitudinal direction.

In an alternative embodiment, a paddle consists of one or more rods which at the lower end are connected with the first power converter and which at the upper end have a float. The float can be a spherical shell of plastic material.

According to a further embodiment, the wave power converter is made with a fan of paddles.

In an embodiment, the wave power converter housing is a cylindrical housing with a bottom and a top, wherein the top has an opening through which the first power converter interacts with the second power converter.

In an alternative embodiment, the distance limiting structure is one or more rods that provide the structural rigidity between top and bottom.

In an embodiment, the rotatable and pivotable connection to the bottom of the wave power converter housing in continuation of the second generatrix consists of a connection where the rotatable part in principle can be located at any point between the end of the chamber casing and the bottom of the wave power converter housing.

In and embodiment, the rotatable and pivotable connection to the bottom of the wave power converter housing in continuation of the second generatrix consists of a connection where the pivotable part in principle can be located at any point between the end of the chamber casing and the bottom of the wave power converter housing.

Also, the rotatable and pivotable part of the connection can be provided as an element which is secured to the chamber casing and the wave power converter housing.

However, it is natural and obvious to prefer that the rotatable part and the pivotable part of the connection are provided in or around the transition between the connection between the chamber housing and the bottom of the wave power converter housing.

According to a preferred embodiment, a fluid based on the ambient water and therefore most often seawater is used in the chamber.

According to an embodiment is used a fluid which is a liquid.

According to a special embodiment is used a fluid which is a gas.

According to a further embodiment, the wave power converter is peculiar in that the rotatable and pivotable connection is designed with a ball head acting in a socket bearing; designed as a hinge which is mounted in a rotary bearing; designed with a spring mounted in a rotary bearing; or a corresponding means.

In a preferred embodiment, the rotatable and pivotable connection is made in that along the second generatrix and outside the chamber casing against the bottom of the wave power converter housing there is a spacer in the form of a shaft terminated by a ball head which acts in a socket bearing at the bottom of the wave converter housing.

In an embodiment, the socket bearing is provided in or close to the passage of the central axis in the bottom of the wave converter housing.

In an embodiment, a plurality of socket bearings and ball heads are provided at the bottom of the wave converter housing.

According to an embodiment of the wave power converter, a spring device is provided between the chamber casing and the ball head, which spring device can be a linear mechanical spring, a pneumatic spring or any other kind of spring device.

The said spring device can have an elastic action, primarily in the longitudinal direction of the chamber casing as well as a resilient action at an angle to the longitudinal direction of the chamber housing.

According to a preferred embodiment, a ball head acts in a socket bearing composed of two bearing parts. A bearing part is provided in connection with or at the bottom itself such that the ball head can be inserted and removed from that bearing part, and a part which subsequently partially surrounds the ball head.

According to an embodiment, means for lubricating the bearing is provided in connection with the ball head and the socket bearing.

According to an alternative embodiment, the wave force converter is peculiar in that the rotatable and pivotable connection is designed as a hinge mounted in a rotary bearing.

The hinge thereby provides the pivotable part of the connection, and the rotary bearing provides the rotatable part of the connection.

In a preferred embodiment, the rotary bearing is provided at the bottom of the wave converter housing and the hinge is mounted therein.

According to an alternative embodiment, the wave force converter is peculiar in that the rotatable and pivotable connection is designed with a spring which is mounted in a rotary bearing or a corresponding arrangement.

The spring thereby provides the pivotable part of the connection, and the rotary bearing provides the rotatable part of the connection.

In a preferred embodiment, the rotary bearing is provided at the bottom of the wave converter housing.

According to a further embodiment, the wave power converter is peculiar in that the first power converter in the wave power converter housing is mounted in a preferably circular rotary bearing for free rotation of the rotary axis about the central axis.

The generatrix of the paddle with its upper and free end and with a fixed point at the lower end of the generatrix will essentially delineate a cone with the apex around the first power converter. The upper and free end of the generatrix will move between points on a curve which is enclosed by an ellipse at a preferably horizontal section through the cone.

The paddle can thereby absorb wave particle movements 360° around the central axis and preferably wave particle movements in horizontal plane.

According to an embodiment, the rotary bearing is made with a complementary shape in order to fit in a turntable as a foot on the first power converter. In the preferred embodiment, the outer area of the turntable is circular for full rotation in the rotary bearing. The rotary bearing is circular as well.

In the turntable and the rotary bearing, respectively, there may be one or more guides in the form of one or more grooves. The guides or grooves constitute a whole circle or a part of a circle According to an alternative embodiment, a lubrication or one or more ball bearings or roller bearings are provided between the rotary bearing and the turntable.

According to an embodiment, the rotary bearing consists of a lower part and an upper part, the parts being separable for inserting and removing the turntable itself. The first power converter can hereby be separated from the second power converter.

According to an embodiment, the rotary bearing and the turntable are made of a metal alloy which can contain bronze, aluminium, nickel, steel or combinations thereof.

According to a further embodiment, the wave power converter is peculiar in that the first power converter is a crank.

As the paddle forms the connection to the crank web, pivoting movements of the paddle will be transmitted to the crank pin which is offset eccentrically relative to the rotary axis of the crank, and as the piston rod at one end interacts with the crank pin, the other end of the piston rod will perform a linear movement back and forth as the other end of the piston rod is moved in a linear chamber which is fixed at one point.

According to an alternative embodiment, one or more discs are fastened on the journal of the crank for connection with the paddle and the journal.

In a preferred embodiment, the journal of the crank coincides with the rotary axis.

In a preferred embodiment, one end of the piston rod is provided with an eyelet which surrounds the crank pin of the crank for in principle free rotation of the piston rod around the crank pin. The eyelet hereby forms a flexible link between the crank and the piston rod.

In an alternative embodiment, one end of the piston rod is provided with a spring which is connected to the crank pin and constitutes a flexible joint. The piston rod can thereby be pivoted around the crank pin. Thereby, actions of force in linear direction of the piston rod can be absorbed and distributed.

In a preferred embodiment, the crank pin is disposed at a position relative to the journal preferably at right angles to the longitudinal direction, whereby deflections of the paddle effectively result in a longitudinal displacement of the piston in longitudinal direction of the piston rod.

In an alternative embodiment, the radial distance between the journal and the crank pin is variable for a resulting variable longitudinal displacement of the piston along the longitudinal direction of the piston rod.

In an embodiment, a plurality of crank pins are provided at various angles relative to the journal. Each crank pin is connected via a piston rod to a cylindrical chamber which in turn is fastened to the bottom of the wave converter housing.

According to a further embodiment, the wave power converter is peculiar in that the first power converter is a swing plate.

A pivoting and rotating movement about the central axis is hereby transformed into a linear, reciprocating movement.

In an embodiment, the swing plate is designed with a plate which on its side facing the bottom is fitted with several, preferably more than three, piston rods, each with a piston moved in each their chamber. The piston rods interact with the plate of the swing plate at their upper ends via a ball joint.

According to a further embodiment, the wave force converter is peculiar in that the chamber is separated by the piston into an upper chamber and a lower chamber.

According to a preferred embodiment, the chamber casing is provided with an end piece at the upper end of the chamber casing, the end piece pressure-tightly surrounding the piston rod for linear guiding of the piston rod through the end piece. The upper chamber is hereby formed between the end piece and the piston.

Hereby is achieved that the movement of the piston from the bottom gives rise to an increased pressure or a displacement of the fluid in the upper chamber. Hereby is achieved that the movement of the piston against the lower end as well as against the upper end of the chamber casing results in a rise in pressure or a displacement of a fluid.

According to a further embodiment, the wave power converter is peculiar in that every chamber has a gate.

An opening is hereby provided for each chamber whereby a fluid can be supplied to each chamber.

In an embodiment, a gate is provided with a valve that allows a fluid to enter the chamber through the gate.

In an embodiment, a gate is provided with a non-return valve which blocks return of fluid pressed out through the gate.

In an embodiment, a gate is provided with a filter by which particles like pebbles, plant residue, gravel and other solid materials are prevented from entering the chamber.

According to a further embodiment, the wave power converter is peculiar in that the wave power converter is fastened to a base.

The wave power converter can thereby be anchored to the bed of the sea or a lake.

According to a preferred embodiment, the base is a gravitational foundation by which is meant that the mass and mass density only are sufficient for holding the base with the wave power converter at the desired position. In a preferred embodiment, the base is made of concrete.

According to an embodiment, the base is designed as a section of a cone with a base, with a large area providing stable support at the bed and with a top with a lesser area, wherein the wave power converter housing is fastened to or inserted in the base.

According to an embodiment, the side of the base is made with an angle adapted such that the paddle in its outermost position with the second and free end finds support on the bed, and the paddle is not in contact with the base.

According to an embodiment, the side of the base is made with a protective layer for receiving the paddle in its outermost position such that the paddle itself finds support on the base.

According to a further embodiment, the base is designed as a shell with a cavity.

With air in the cavity, a certain buoyancy in the base is achieved which then can be moved and transported more easily. At the final location of the base, the cavity is filled with sand or stones from the bed.

According to a further embodiment, the base is provided with means for fastening pulleys and anchoring devices.

According to a preferred embodiment, the base is provided with a space for fitting in the wave converter housing. Hereby is meant that the wave power converter housing can be embedded in the base whereby protection of one or more parts can be achieved.

In a concrete embodiment, the space in the base is shaped as a cylinder with an open end and in which cylinder the wave power housing can be inserted. The wave power converter housing is fastened to the base by means of bolts.

According to a further embodiment, the wave power converter is peculiar in that at least one paddle is buoyant in water.

Hereby is achieved that the upper end of the paddle will seek to the water surface and a rest position which in still water will put the paddle in a vertical position. By wave particle movements in connection with currents or waves, the paddle will therefore absorb these movements which are propagated to the first power converter.

According to an alternative embodiment, the buoyancy is variable in that a paddle has a cavity which can be filled with air or water. The dynamic properties of the paddle can thereby be varied and thereby the ability of the paddle to absorb wave particle movements.

In a special embodiment, the paddle is provided as a rod which at the lower end is mounted on the first power converter and which at the upper end is connected to a float.

It is within the scope of the present wave power converter that the skilled in the art may conduct experiments with different embodiments and combinations of paddles and with their positions and with variations in buoyancy.

According to a further embodiment, the wave power converter is peculiar in that the wave power converter is made of one or more corrosion-proof materials.

In a preferred embodiment, elements in the wave power converter are made of stainless steel, as e.g. Duplex Stainless Steel or Super Stainless Steel. It lies within the scope of choice of materials that materials with corresponding properties as regards strength and/or corrosion are applied.

Also, it is a matter of course to use other materials with corresponding or better strength, flexibility or corrosion properties.

According to an actual embodiment, the wave power converter is made with a paddle length of about 30 m. The diameter of the chamber is about 0.35 m and the piston has a stroke in the chamber of about 0.70 m. The fluid in each chamber is seawater. The seawater is introduced in the chamber through a simple mechanical filter.

This embodiment of the wave force converter find application in particular in areas with a depth of the sea of 30 to 50 m.

According to a further embodiment, the wave power converter is peculiar in that at least one wave power converter has a connection to at least one machine interacting with at least one generator.

Compression or displacement of a fluid in a chamber in the wave power converter results in driving a machine which via an electromagnetic arrangement interacts with a generator by which electricity is produced.

The energy from the wave particle movements is hereby transmitted through the wave power converter to the machine and to the generator which transforms the energy into electric energy.

According to a preferred embodiment, the connection between the wave power converter and the generator is a pipe or pipe system which conducts the fluid to a turbine that interacts with the generator delivering electricity.

The pipe system is made of corrosion-proof material.

DESCRIPTION OF THE DRAWING

The present invention is shown in an embodiment in the following Figures, wherein.

DETAILED DESCRIPTION OF EMBODIMENTS OF THE INVENTION

Figure 1:
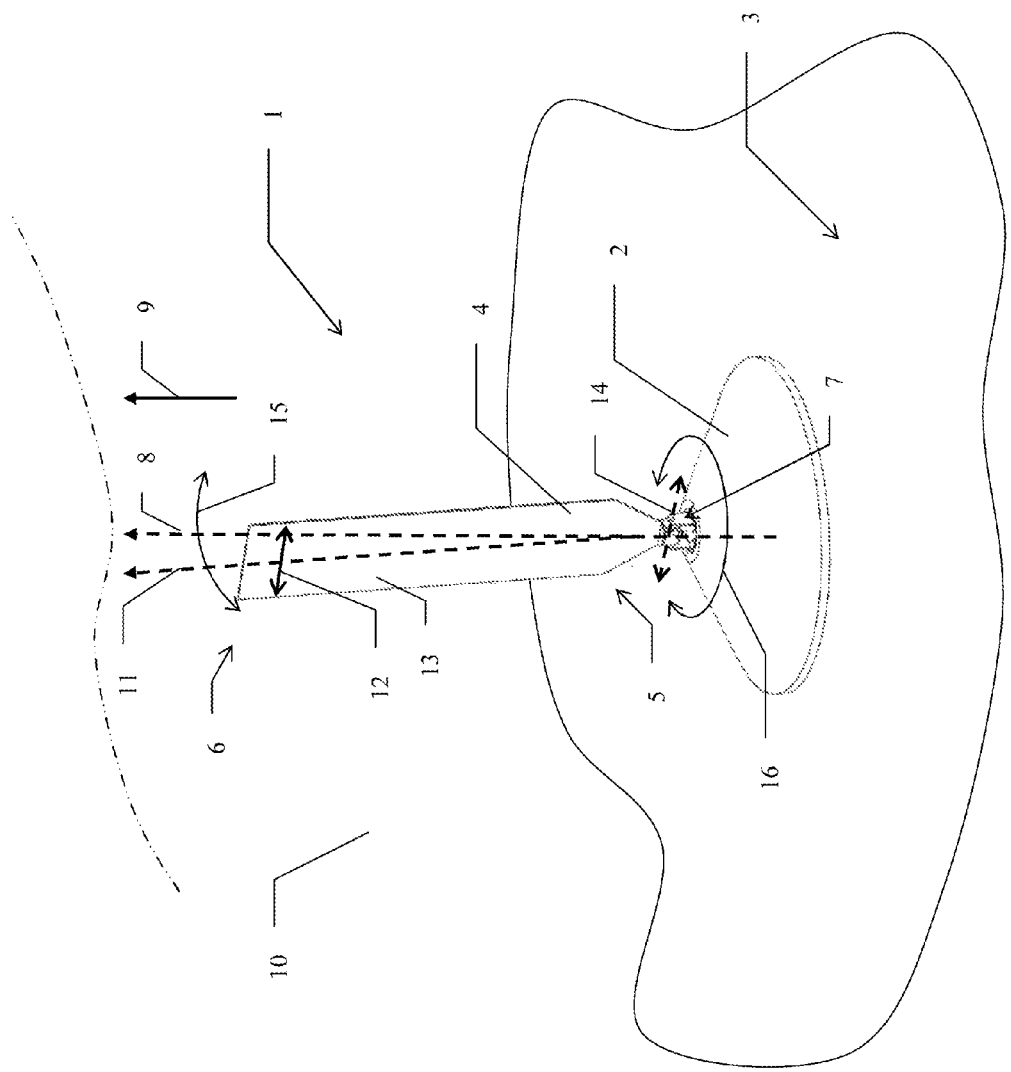
FIG. 1 shows a wave power converter with a paddle embedded in a base located on a seabed.

FIG. 1 shows an isometric view of a wave power converter 1 connected to a base 2 located at a bed 3 which can be a seabed or a bed in a large lake.

In the shown embodiment, the wave power converter 1 is provided with a paddle 4 with a lower end 5 and a free upper end 6. At a first end 5, the paddle 4 is connected to a first power converter 7 which is shown here fastened to the base 2.

In a rest position, the wave power converter 1 has a central axis 8 which in the concrete embodiment is parallel with the direction of gravity and with a direction oriented in the direction of buoyancy 9, and thereby opposite the direction of gravity, in the water 10 which is understood to be seawater or lake water.

The paddle 4 has a longitudinal direction of a first generatrix 11 and at right angles thereof a transverse direction 12, in which transverse direction the paddle 4 has a paddle face 13.

The first power converter 7 has a rotary axis 14 located in a plane perpendicular to the central axis 8 and about which the paddle 4 is pivotably fastened such that the paddle 4 and thereby the first generatrix 11 can be pivoted preferably around the central axis 8 at a deflection angle 15.

The first power converter 7 has free centre axis rotation 16 about the central axis 8.

Figure 2:
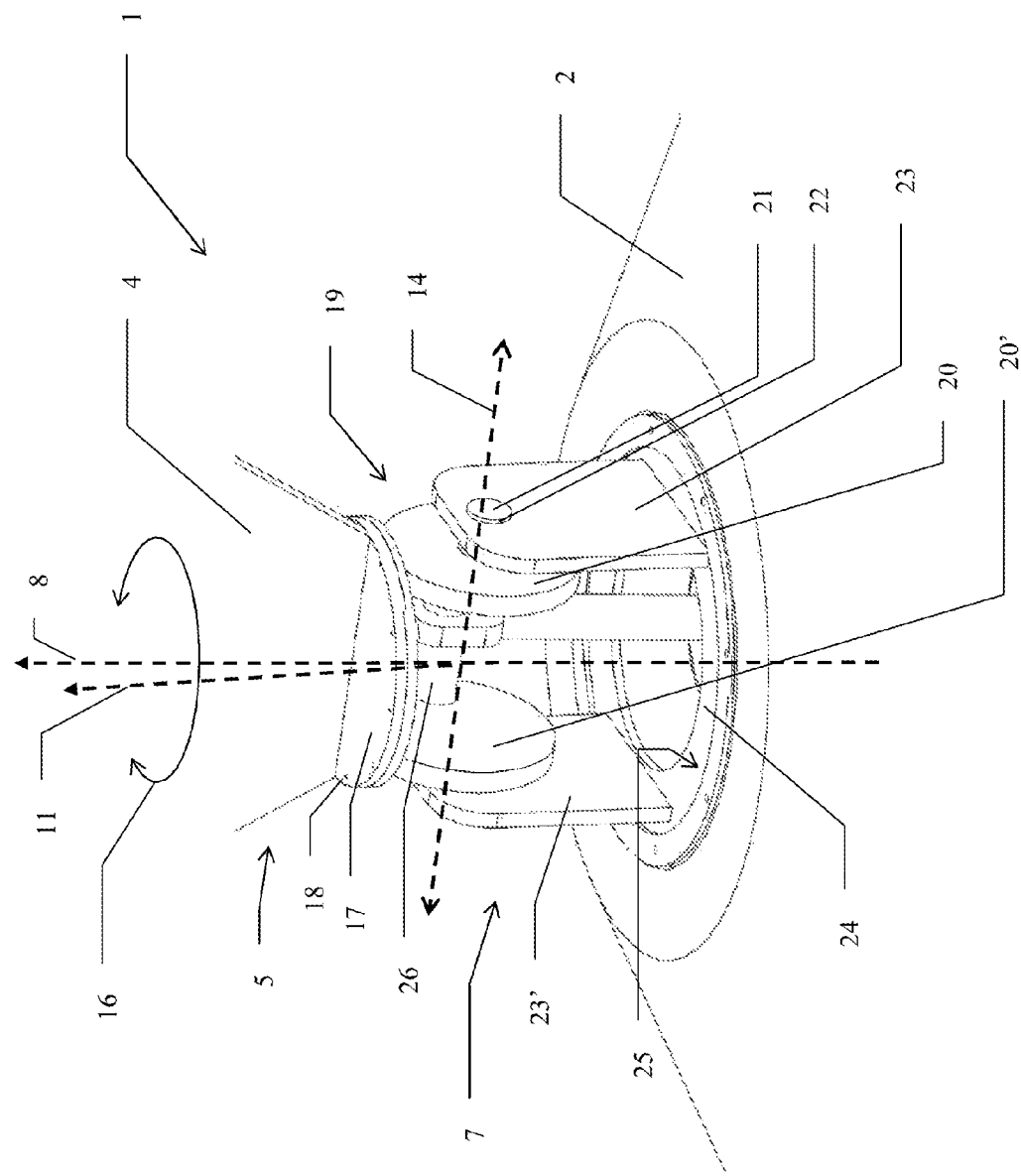
FIG. 2 shows the transition between a paddle and a first power converter in the vicinity of a base.

FIG. 2 shows, compared with FIG. 1, a detail of a wave power converter 1 in connection with the base 2.

The lower end 5 of the paddle 4 is connected to the first power converter 7 through a first connection 17 which can be released via bolts 18.

The first power converter 7 is here a crank 19, and in the shown embodiment the first connection 17 is fastened to an upper edge area of in this case two crank webs 20, 20' mounted on a journal 21 which acts in bearings 22, 22' in holders 23, 23' mounted in a turntable 24 acting in a rotary bearing 25. The bearings 22, 22' define the rotary axis 14 and are disposed equidistantly from the turntable 24 whereby the rotary axis 14 is rotated in a plane perpendicular to the central axis 8 in a free centre axis rotation 16.

Between the crank webs 20, 20', the crank 19 is provided with a crank pin 26 which is offset eccentrically relative to the journal 21—the rotary axis 14.

Figure 3:
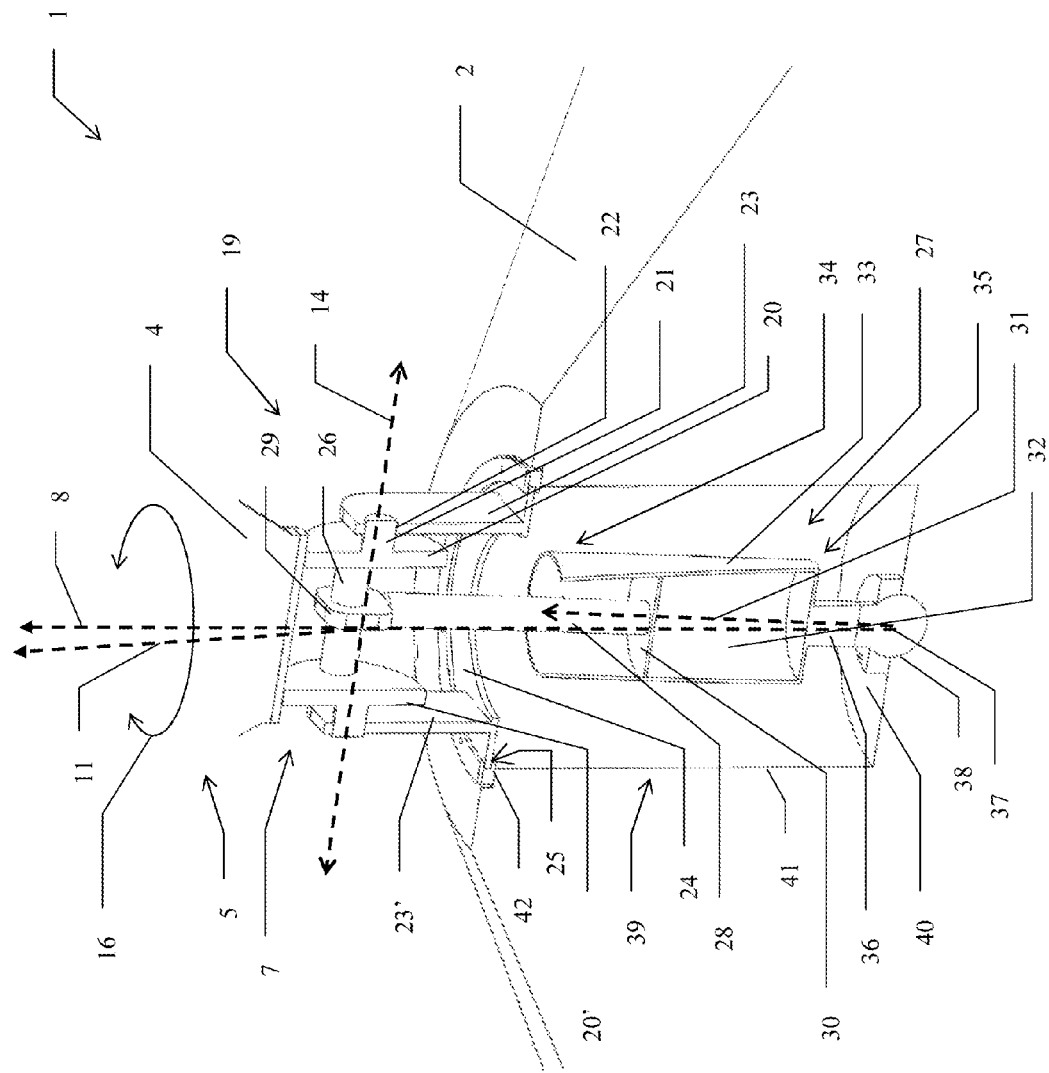
FIG. 3 shows a first power converter interacting with a second power converter embedded in a base.

FIG. 3 shows in the context of FIGS. 1 and 2 a vertical section through the wave power converter 1 and the base 2.

The first power converter 7 of the wave power converter 1, here the rotatable crank 19, is seen to interact with a second power converter 27.

In the concrete embodiment, the second power converter 27 interacts with the first power converter 19 via a piston rod 28 which at a first end is provided with a flexible joint 29 designed as a rotary bearing which is complementary to the cross-section of the crank pin 26, and which at the other end is terminated by a piston 30 configured for a linear movement along a second generatrix 31 in a chamber 32 surrounded by a chamber casing 33 through the upper chamber casing end 34 of the chamber casing 33 which in the shown embodiment is an open end. The lower chamber casing end 35 of the chamber casing 33 is connected via a spacer 36 to a ball head 37 which in turn acts in a socket bearing 38 fastened to the bottom 40 of a wave power converter housing 39. The centre point of the ball head 37 thereby forms a fixed point for the second generatrix 31. The spacer 36, the ball head 37 and the socket bearing 38 thus forms a form-fit connection between the chamber casing 33 and the wave converter housing 39. The form-fit connection is pivotable and rotatable around the central axis 8.

The wave power converter housing 39 has a wall enclosing the chamber casing 33 and which constitutes a distance limiting structure 41 between the second power converter 27 and the first power converter 19 which is fastened at the top 42 of the wave power converter housing 39, as the turntable 24 acts in the rotary bearing 25 which is mounted at the top 42 of the wave power converter housing 39.

In the concrete embodiment, the wave power converter housing 39 is embedded in the base 2 and fastened to the base 2 by the rotary bearing 25, whereby the wave power converter housing 39 can be loosened and displaced out of the base 2.

The invention claimed is:

1. A wave power converter comprising:
   a wave power converter housing with a bottom and a top, and between the top and the bottom there is a distance limiting structure, and a central axis; and
   at least one paddle entirely or partially outside the wave power converter housing, having a longitudinal direction of a first generatrix and a lower end and an upper end, the at least one paddle being connected with a first power converter via a first connection, the first power converter having a rotary axis at an angle to the central axis and fastened to the wave power converter housing at the top;
   wherein the first power converter, via at least one piston rod, interacts with at least one second power converter, and a first end of the piston rod, via a flexible joint, is fastened to the first power converter, and a second end of the piston rod has a piston adapted for a linear movement along a second generatrix in the at least one second power converter, the at least one second power converter includes a linear chamber surrounded by a chamber casing, wherein the chamber casing has a rotatable and pivotable connection to the wave power converter housing at the bottom in continuation of the second generatrix.

2. The wave power converter according to claim 1, wherein the rotatable and pivotable connection is a ball head acting in a socket bearing that is at least one: a hinge which is mounted in a rotary bearing; a spring mounted in a rotary bearing; or made by corresponding means.

3. The wave power converter according to claim 1, wherein the first power converter in the wave power converter housing is mounted in a circular rotary bearing for free rotation of the rotary axis about the central axis.

4. The wave power converter according to claim 1, wherein the first power converter is a crank.

5. The wave power converter according to claim 1, wherein the first power converter is a swing plate.

6. The wave power converter according to claim 1, wherein the linear chamber is separated by the piston into an upper chamber and a lower chamber.

7. The wave power converter according to claim 1, wherein every linear chamber has a gate.

8. The wave power converter according to claim 1, wherein the wave power converter housing is fastened to a base.

9. The wave power converter according to claim 1, wherein the at least one paddle is buoyant in water.

10. The wave power converter according to claim 1, wherein the wave power converter is made of one or more corrosion-proof materials.

11. The wave power plant consisting of at least one wave power converter according to claim 1, wherein at least one wave power converter has a connection to at least one machine interacting with at least one generator.

12. The wave power converter according to claim 2, wherein the first power converter in the wave power converter housing is mounted in a circular rotary bearing for free rotation of the rotary axis about the central axis.

13. The wave power converter according to claim 3, wherein the first power converter is a crank.

14. The wave power converter according to claim 4, wherein the first power converter is a swing plate.

15. The wave power converter according to claim 5, wherein linear the chamber is separated by the piston into an upper chamber and a lower chamber.

16. The wave power converter according to claim 6, wherein every linear chamber has a gate.

17. The wave power converter according to claim 7, wherein the wave power converter housing is fastened to a base.

18. The wave power converter according to claim 8, wherein the at least one paddle is buoyant in water.

19. The wave power converter according to claim 9, wherein the wave power converter is made of one or more corrosion-proof materials.

20. The wave power plant consisting of at least one wave power converter according to claim 10, wherein at least one wave power converter has a connection to at least one machine interacting with at least one generator.

* * * * *